(12) United States Patent
Heuver et al.

(10) Patent No.: US 9,845,832 B2
(45) Date of Patent: Dec. 19, 2017

(54) VEHICLE TRANSMISSION AND METHOD OF ASSEMBLING VEHICLE TRANSMISSION

(71) Applicant: Ford Global Technologies, LLC, Dearborn, MI (US)

(72) Inventors: Bradley Ronald Heuver, South Lyon, MI (US); Marv Young, Dearborn, MI (US); Carl Garbacik, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 784 days.

(21) Appl. No.: 14/178,979

(22) Filed: Feb. 12, 2014

(65) Prior Publication Data
US 2015/0226276 A1    Aug. 13, 2015

(51) Int. Cl.
| | |
|---|---|
| *F16D 13/68* | (2006.01) |
| *F16D 13/52* | (2006.01) |
| *F16D 13/70* | (2006.01) |
| *F16D 25/0638* | (2006.01) |
| *F16D 55/40* | (2006.01) |
| *F16D 13/64* | (2006.01) |

(Continued)

(52) U.S. Cl.
CPC .......... *F16D 25/0638* (2013.01); *B60T 1/062* (2013.01); *F16D 13/52* (2013.01); *F16D 13/646* (2013.01); *F16D 13/68* (2013.01); *F16D 13/683* (2013.01); *F16D 13/70* (2013.01); *F16D 55/32* (2013.01); *F16D 55/40* (2013.01); *Y10T 29/49464* (2015.01)

(58) Field of Classification Search
CPC ......... F16D 13/00–13/76; F16D 25/00–25/14; F16D 25/0638
See application file for complete search history.

(56) References Cited

U.S. PATENT DOCUMENTS

| | | | | |
|---|---|---|---|---|
| 3,044,595 A | * | 7/1962 | Herr, Jr. .................. | F16D 25/10 192/48.613 |
| 3,893,556 A | * | 7/1975 | Lech, Jr. ............. | F16D 25/0638 188/170 |
| 4,092,770 A | | 6/1978 | Polashak | |

(Continued)

FOREIGN PATENT DOCUMENTS

| | | | | |
|---|---|---|---|---|
| DE | 4007942 C1 | * | 9/1990 | .............. F16B 21/16 |
| KR | 1020060057903 | | 5/2006 | |
| KR | 101013894 | | 2/2011 | |

*Primary Examiner* — Richard Lorence
*Assistant Examiner* — David Morris
(74) *Attorney, Agent, or Firm* — Diedericks & Whitelaw, PLC

(57) ABSTRACT

A vehicle transmission includes a transmission shaft, a friction element assembly mounted on the transmission shaft, a piston assembly for actuating the friction element assembly, a snap ring for retaining the friction element assembly and a mounting groove formed in the transmission shaft. The snap ring is installed into the mounting groove by expanding the snap ring and then allowing the snap to contract and enter the mounting groove. The mounting groove is located such that the snap ring could exit the mounting groove upon expansion of the snap ring due to a centrifugal force. Accordingly, various arrangements are provided to prevent the snap ring from leaving the mounting groove after installation.

17 Claims, 8 Drawing Sheets

(51) Int. Cl.
*B60T 1/06* (2006.01)
*F16D 55/32* (2006.01)

(56) References Cited

U.S. PATENT DOCUMENTS

| | | | |
|---|---|---|---|
| 4,732,253 A * | 3/1988 | Hiramatsu | F16D 25/0638 |
| | | | 192/106 F |
| 5,788,399 A * | 8/1998 | Smearsoll | F16D 1/06 |
| | | | 403/319 |
| 5,913,397 A | 6/1999 | Okada et al. | |
| 6,193,042 B1 * | 2/2001 | Kempf | F16D 25/0638 |
| | | | 192/70.16 |
| 7,070,036 B2 | 7/2006 | Fernandez | |
| 8,348,802 B2 | 1/2013 | Heuver | |
| 2010/0025181 A1 * | 2/2010 | Guenter | F16D 25/083 |
| | | | 192/85.01 |

\* cited by examiner

| | Brk A | Brk B | Clt C | Clt D | Clt E | Clt F | OWC |
|---|---|---|---|---|---|---|---|
| 1st | X | X | | (O) | X | | X |
| 2nd | X | X | X | X | | | X |
| 3rd | X | | X | X | X | | |
| 4th | X | | X | X | | X | |
| 5th | X | | X | | X | X | |
| 6th | X | | | X | X | X | |
| 7th | | | X | X | X | X | |
| 8th | | X | | X | X | X | |
| 9th | | X | X | | X | X | |
| 10th | | X | X | X | | X | |
| Rev | X | X | | X | | X | |

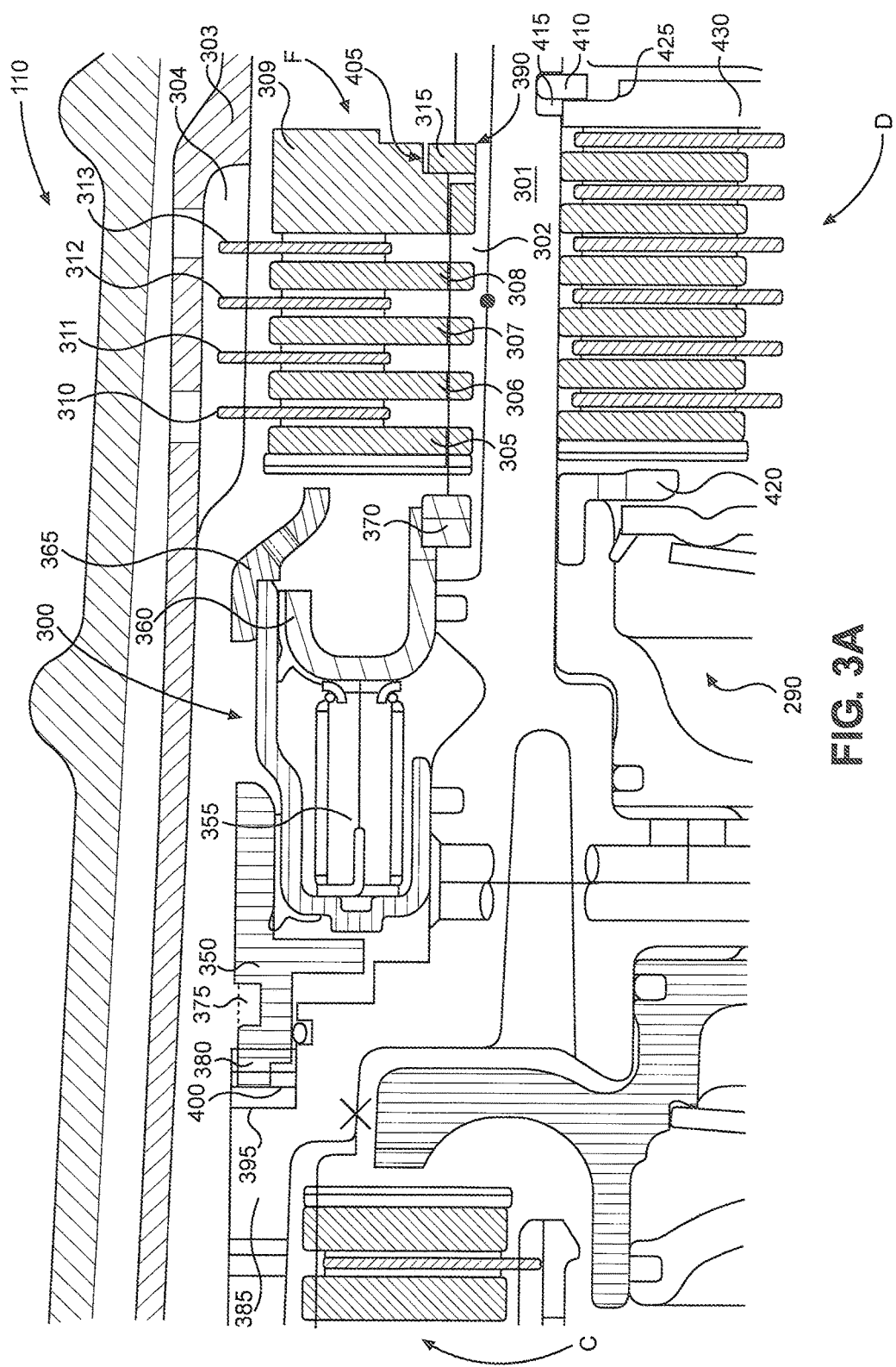

VEHICLE TRANSMISSION AND METHOD OF ASSEMBLING VEHICLE TRANSMISSION

BACKGROUND OF THE INVENTION

The present invention pertains to a transmission for a motor vehicle, and, more particularly, to a transmission configured to prevent a snap ring, securing a friction element assembly of the transmission, from exiting a groove provided for the snap ring.

In a typical transmission for a motor vehicle, there are a number of friction element assemblies, such as clutches or brakes, each friction element assembly including multiple plates and friction members. During operation of the vehicle, in order to apply a friction element, a piston assembly contacts and then compresses the plates and friction members together. For this compression to occur, movement of the plates and friction members must be restricted in some way. Generally, a snap ring is provided for this purpose, although other portions of the transmission are sometimes used when allowed by the structure of the transmission.

During assembly of the transmission, the friction element assembly is installed followed by the snap ring, which is of the type that is contracted during installation. In order for the snap ring to be installed there must be sufficient room near the friction element assembly for the snap ring to be contracted. After the snap ring is installed, it is allowed to expand back to its default size. When the friction element assembly associated with the snap ring rotates, a centrifugal force acts on the snap ring, which may cause the snap ring to expand if there is room for it to expand. Generally, however, this expansion is arrested by another portion of the transmission, such as a transmission shaft, and the centrifugal force acts to hold the snap ring in place.

In contrast, when the snap ring is of a type that is expanded during installation before being allowed to contract back to its default size, then the centrifugal force caused by rotation of a corresponding friction element assembly will result in the snap ring expanding and this expansion will not be sufficiently arrested. This is because space must be provided for the snap ring to be expanded during installation and this space also allows the snap ring to expand during rotation of the friction element. As a result, this type of snap ring is not typically used for such applications since the expanded snap ring can exit its installation position during operation. If that occurs, the friction element assembly corresponding to that snap ring cannot be actuated by its piston assembly. However as transmission designs become increasingly complex, it is not always possible to arrange friction element assemblies such, that the use of such snap rings is avoided. Therefore, there is a need in the art for a transmission design that allows for the installation of a snap ring that is expanded during installation, and that prevents the snap ring from moving once installed.

SUMMARY OF THE INVENTION

The present invention is directed to a vehicle transmission and a method of assembling the vehicle transmission. The transmission includes a transmission shaft, a friction element assembly mounted on the transmission shaft, a piston assembly for actuating the friction element assembly, a snap ring for retaining the friction element assembly and a mounting groove formed in the transmission shaft. The snap ring is installed into the mounting groove by expanding the snap ring and then allowing the snap to contract and enter the mounting groove. The mounting groove is located such that the snap ring could exit the mounting groove upon expansion of the snap ring due to a centrifugal force. Accordingly, various arrangements are provided to prevent the snap ring from leaving the mounting groove after installation.

In one preferred embodiment, the transmission further includes a transmission member with an assembly notch and an operational notch, and the piston assembly has a corresponding protrusion. When the piston assembly is in an assembly position, the protrusion is located in the assembly notch and the friction element assembly does not cover the mounting groove. When the piston assembly is moved to an operational position by rotation, the protrusion is located in the operational notch and a pressure plate of the friction element assembly covers the mounting groove to prevent the snap ring from leaving the mounting groove due to a centrifugal force.

In another preferred embodiment, the transmission does not include a transmission member with an assembly notch and an operational notch. Instead, after installation of the first snap ring, a snap ring keeper and a second snap ring are installed. During installation, the second snap is contracted and then allowed to expand to contact a pressure plate of the friction element assembly. The snap ring keeper is located such that it contacts both the first snap ring and the second snap ring. As a result, the second snap ring and the snap ring keeper prevent the first snap ring from leaving the mounting groove due to a centrifugal force. Alternatively, a third snap ring is used in place of the snap ring keeper.

Additional objects, features and advantages of the present invention will become more readily apparent from the following detail description of preferred embodiments when taken in conjunction with the drawings wherein like reference numerals refer to corresponding parts in the several views.

BRIEF DESCRIPTION OF THE DRAWINGS

FIG. 3A is a partial cross-section showing a friction element assembly and a piston assembly in an operational position in accordance with a first embodiment of the present invention;

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale; and some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
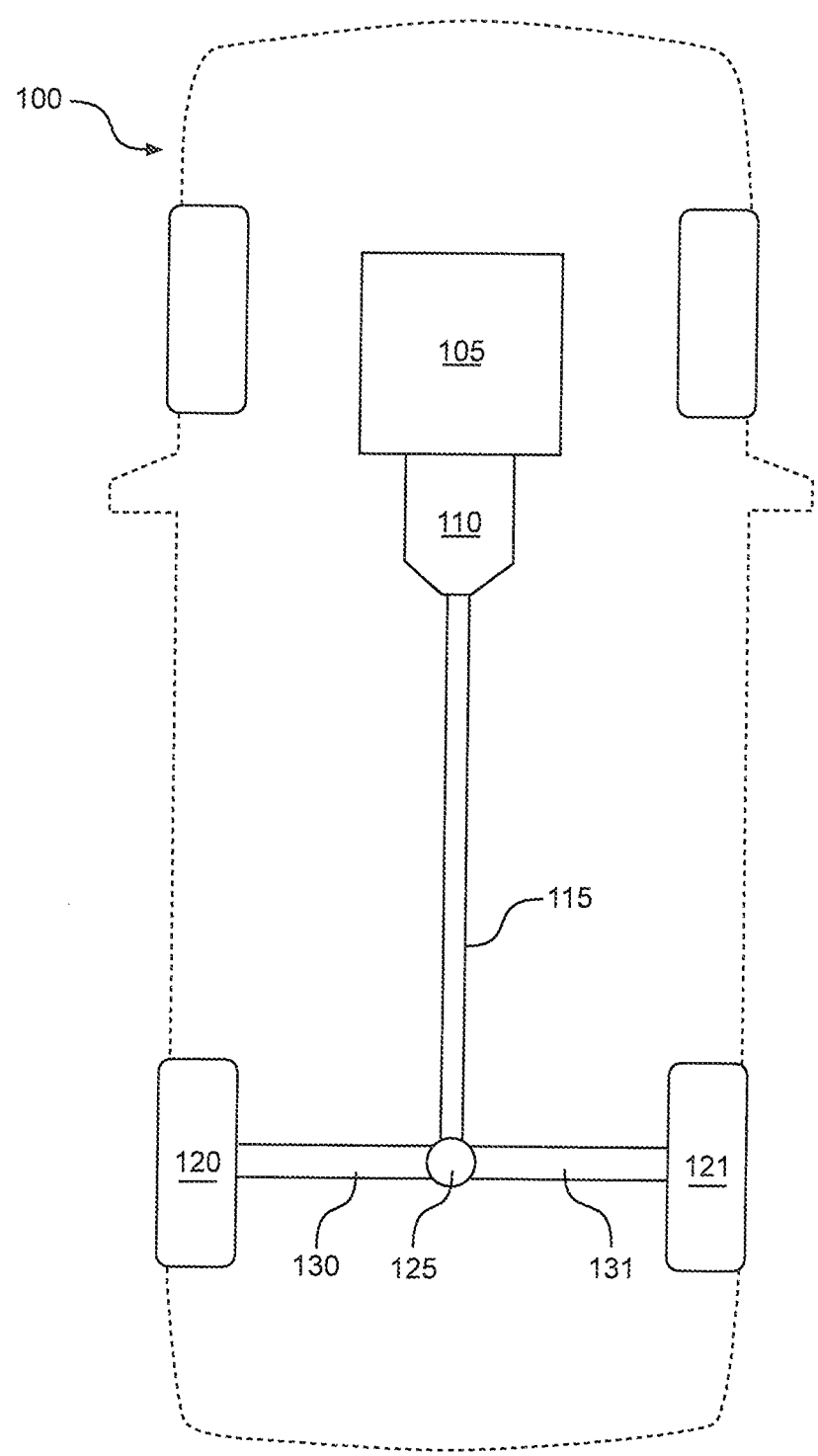
FIG. 1 is a schematic view of a motor vehicle in accordance with the present invention.

With initial reference to FIG. 1, there is shown a motor vehicle 100 in accordance with the present invention. Vehicle 100 has a power source 105, such as an internal combustion engine or an electric motor, connected to a transmission 110. Power is transmitted from power source 105 to transmission 110 and then to a driveshaft 115, which transmits the power to rear wheels 120, 121 through a differential assembly 125 and half shafts 130, 131. In such a configuration, vehicle 100 is a rear-wheel drive vehicle. However, additional configurations are usable in connection with the present invention. For example, in other embodiments, vehicle 100 is front-, four- or all-wheel drive. In the four- and all-wheel drive embodiments, vehicle 100 would also include a transfer case, a second driveshaft, a second differential assembly and two more half shafts (not shown). Additionally, power source 105 does not need to be located in a front portion of vehicle 100, but can instead by located elsewhere, as in a rear- or a mid-engine embodiment.

Figure 2A:
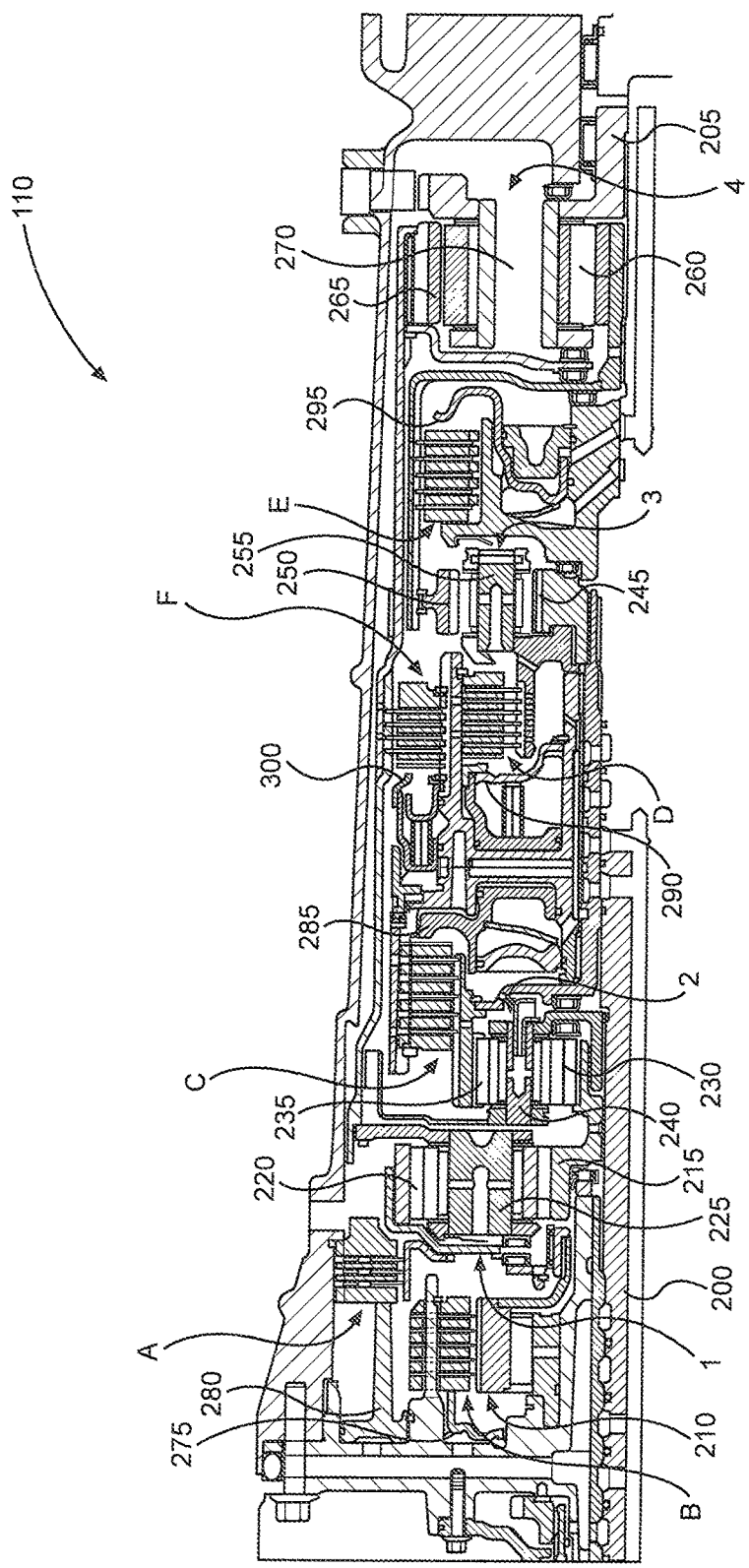
FIG. 2A is a partial cross-section of a transmission of the motor vehicle.
Figures 2B, 2C:
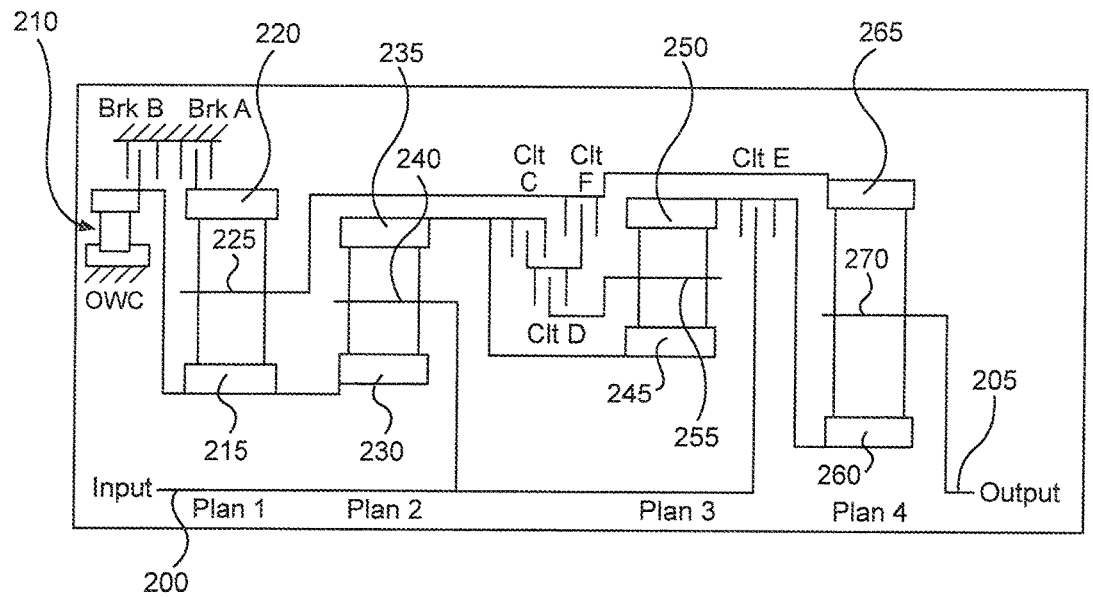
FIG. 2B is a schematic view of the transmission.
FIG. 2C is a chart of a friction element assembly application schedule for the transmission.

Referring now to FIGS. 2A and 2B, transmission 110 is shown in greater detail. In this embodiment, transmission 110 is a ten-speed transmission (i.e., it has ten different forward gear ratios) although the present invention is not limited to use with such a transmission. Transmission 110 includes an input 200, an output 205, a one-way clutch 210, a brake A, a brake B, a clutch C, a clutch D, a clutch E, a clutch F, four sets of gears and a piston assembly for each of brakes A and B and clutches C, D, F and F. The four sets of gears each have a sun gear, a ring gear and at least one planetary gear, which together define a planetary gear set. In particular, FIG. 2A shows a first sun gear 215, a first ring gear 220 and a first planetary gear 225 defining a planetary gear set 1; a second sun gear 230, a second ring gear 235 and a second planetary gear 240 defining a planetary gear set 2; a third sun gear 245, a third ring gear 250 and a third planetary gear 255 defining a planetary gear set 3; and a fourth sun gear 260, a fourth ring gear 265 and a fourth planetary gear 270 defining a planetary gear set 4. Piston assemblies 275 and 280 are associated with brakes A and B, respectively, while piston assemblies 285, 290, 295 and 300 are associated with clutches C, D, E and F, respectively.

Each of brakes A and B and clutches C, D, E and F includes a plurality of plates and a plurality of friction members. For example, with reference to FIGS. 3A and 3B, clutch F includes plates 305, 306, 307, 308 and 309 coupled to a transmission shaft 301 through a spline connection 302 and friction members 310, 311, 312 and 313 coupled to a clutch drum 303 through another spline connection 304. To apply clutch F, piston assembly 300 is caused to move to the right with respect to FIG. 2A. As piston assembly 300 moves to the right, it will contact plate 305, which will contact friction member 310 in turn and so on down the line. The rightward movement of plates 305, 306, 307, 308 and 309 and friction members 310, 311, 312 and 313 is halted by a snap ring 315. At this point, friction created between plates 305, 306, 307, 308 and 309 and friction members 310, 311, 312 and 313 causes them all to rotate together. As a result, rotational motion is transmitted from transmission shaft 301 to clutch drum 303, and vice versa.

In general, transmission 110 converts an input torque coming from power source 105 to an output torque going to rear wheels 120, 121 by adjusting a gear ratio (for example, during an upshift or a downshift) between input 200 and output 205. This adjustment is accomplished by applying or releasing friction element assemblies (i.e., one-way clutch 210, brakes A and B and clutches C, D, B and F) in order to change torque relationships by altering gear configurations of transmission 110. As a result, power flow paths are established and disestablished from power source 105 to rear wheels 120, 121. This is more clearly shown in connection with FIG. 2B, which is a schematic view of transmission 110, and FIG. 2C, which is a chart showing a friction element assembly application schedule.

Figure 3B:
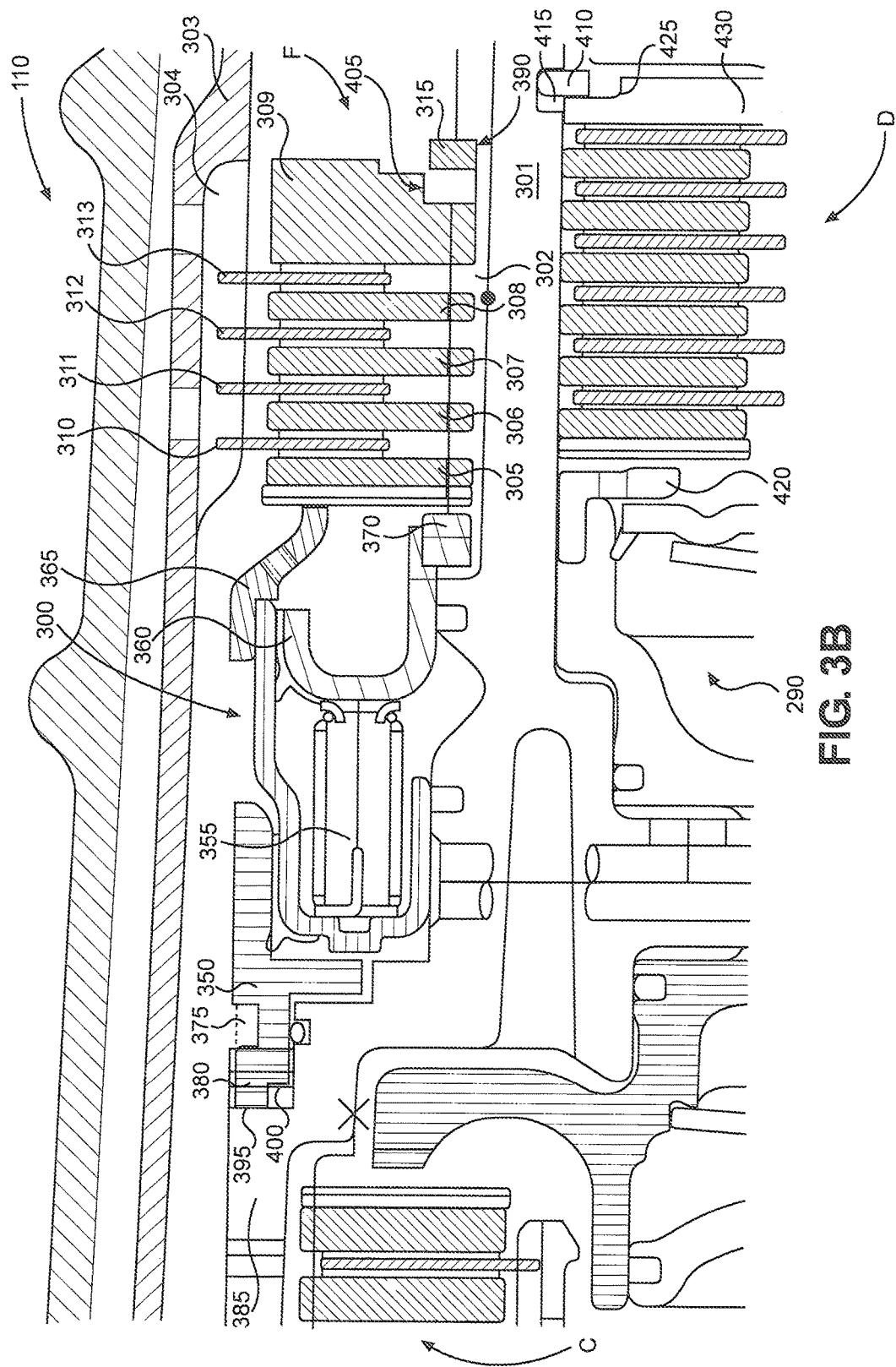
FIG. 3B is a partial cross-section showing the friction element assembly and the piston assembly in an assembly position in accordance with the first embodiment.
Figure 4:
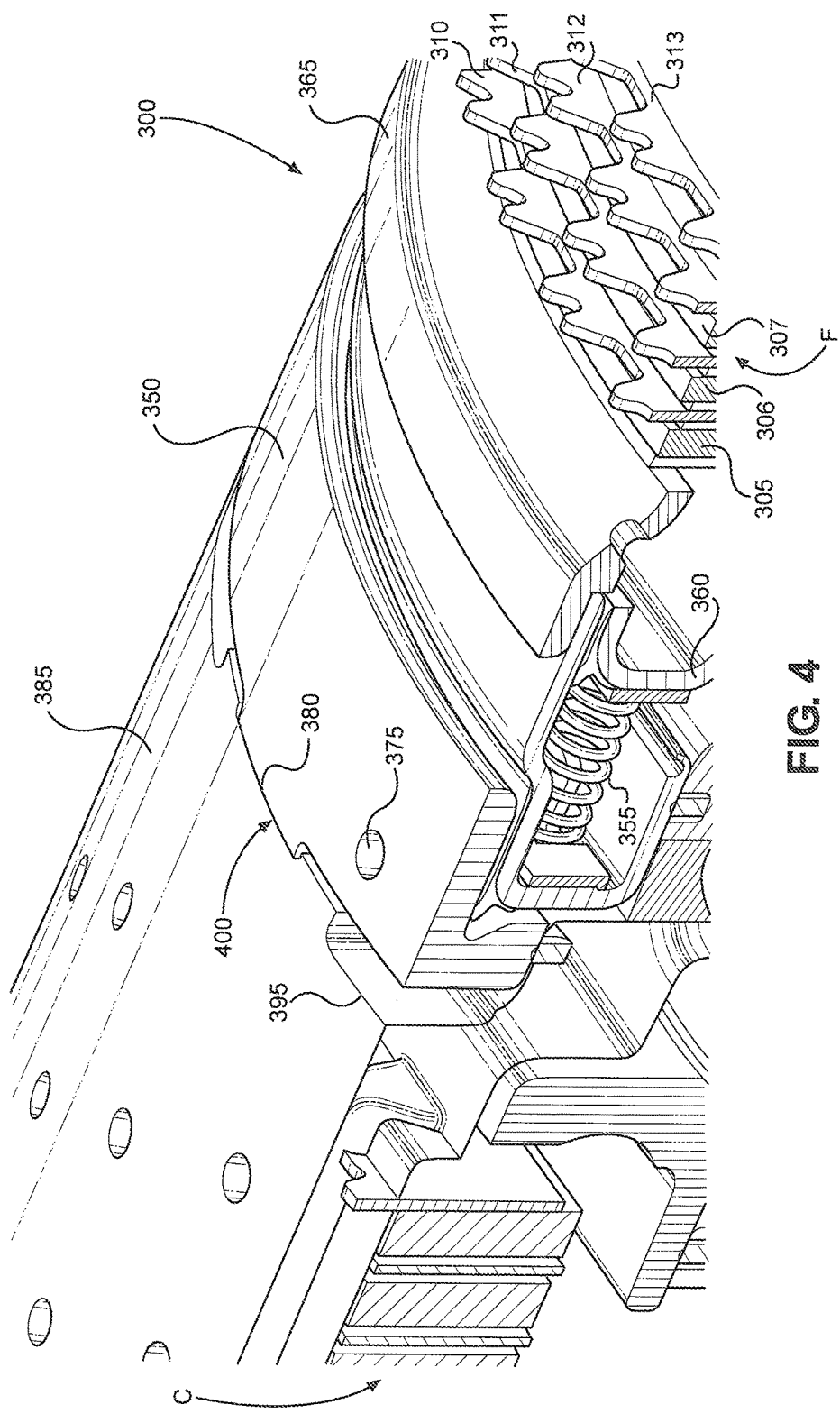
FIG. 4 is a perspective view showing the friction element assembly and the piston assembly in the operational position in accordance with the first embodiment.

With reference now to FIGS. 3A and 3B, a portion of transmission 11 near clutches C, D and F is shown. Piston assembly 300 includes a piston cap 350, a piston spring 355, a balance piston 360, a piston 365 and a piston snap ring 370. Piston cap 350 has a hole 375 and a protrusion 380. During assembly of transmission 110, piston assembly 300 is inserted into transmission 110 and moves from the right side of FIG. 3 toward the left side until piston assembly 300 contacts a transmission member 385. Next clutch F is inserted into transmission 110 and moves from the right side of FIG. 3 toward the left side. As discussed above, snap ring 315 holds clutch F in place so that clutch F is compressed when piston assembly 300 moves to the right. As can be seen in FIG. 3A, there is insufficient space by pressure plate 309 to insert snap ring 315 into a mounting groove 390. In order to place snap ring 315 in mounting groove 390, clutch F must be moved further to the left. To accomplish this, piston assembly 300 must also move to the left. However, piston assembly 300 is not configured to be moved, or compressed, to the left a sufficient distance during assembly while also functioning properly during operation (i.e., being able to move to the right a sufficient distance). To solve this problem, transmission member 385 is provided with an assembly notch 395 and an operational notch 400, which are best seen in FIG. 4.

Accordingly, during assembly, as piston assembly 300 is inserted into transmission 110, protrusion 380 is aligned with and then placed into assembly notch 395. Assembly notch 395 is sufficiently deep such that piston assembly 300 is able to move to the left (or upper left with respect to FIG. 4) far enough for snap ring 315 to be installed into mounting groove 390. However, in this position, which is shown in FIG. 3B, piston assembly 300 cannot move far enough to the right (or lower right with respect to FIG. 4) to properly apply clutch F. To remedy this once snap ring 315 is installed, a tool (not shown) is inserted into hole 375 of piston cap 350 and used to move piston assembly 300 toward the right. Once protrusion 380 exits assembly notch 395, piston assembly 300 is rotated until protrusion 380 is aligned with operational notch 400. Piston assembly 300 is then allowed to move back to the left so that protrusion 380 enters operational notch 400, as shown in FIGS. 3A and 4. There are no forces applied during operation of vehicle 100 that would cause piston cap 350 to move to the right and, as a result, protrusion 380 of piston assembly 300 will not exit operational notch 400 unless the tool is used. Operational notch 400 is less deep than assembly notch 395. Hence, in this position, piston assembly 300 is able to move to the right far enough to properly apply clutch F. Additionally, clutch F is prevented by piston assembly 300 from moving far enough to the left for snap ring 315 to exit mounting groove 390. Similarly, the expansion of snap ring 315 is prevented by an arresting surface 405 (see FIGS. 3A and 3B) of pressure plate 309. When clutch F rotates at high speed, a centrifugal force causes snap ring 315 to expand outward (i.e., toward the top of the page in FIG. 3). However, this expansion is stopped by arresting surface 405. As a result, it should be clear that this arrangement prevents snap ring 315 from exiting mounting groove 390 when piston assembly 300 is in operational notch 400 (shown in FIGS. 3A and 4), while allowing snap ring 315 to be installed when piston assembly 300 is in assembly notch 395 (shown in FIG. 3B).

In contrast, with reference to FIGS. 3A and 3B, clutch D shows a more typical arrangement for a clutch, piston and snap ring. Specifically, clutch D is held in place by a snap ring 410, located in a mounting groove 415, and is applied by a piston 420 of piston assembly 290. Snap ring 410 is of the type that is contracted during installation and then allowed to expand back to its default state. Accordingly, a notch 425 is provided in a pressure plate 430 of clutch D. When snap ring 410 is contracted, it fits into notch 425, and, when it expands, it moves into mounting groove 415. A centrifugal force resulting from rotation of clutch D will tend to cause snap ring 415 to expand outward (i.e., toward the top of the page). However, this expansion is prevented by transmission shaft 301. Accordingly, it should be that clear that in such an arrangement there is no need for an assembly notch and a operational notch because there is sufficient space for installation of snap ring 410 yet no possibility of snap ring 410 leaving mounting groove 415 due to a centrifugal force. Conversely, in connection with clutch F, snap ring 315 will tend to expand and leave mounting groove 390 when rotating at a high speed unless arresting surface 405 is provided. However, arresting surface 405 simultaneously prevents snap ring 315 from being inserted into mounting groove 390. Hence, assembly notch 395 is provided so that piston assembly 300 and clutch F can be shifted to the left far enough for snap ring 315 to be installed. Unlike with clutch D, placing a notch similar to notch 425 in pressure plate 309 would allow snap ring 315 to be installed, but would also allow snap ring 315 to exit mounting groove 390 at high rotational speeds.

Figure 5:
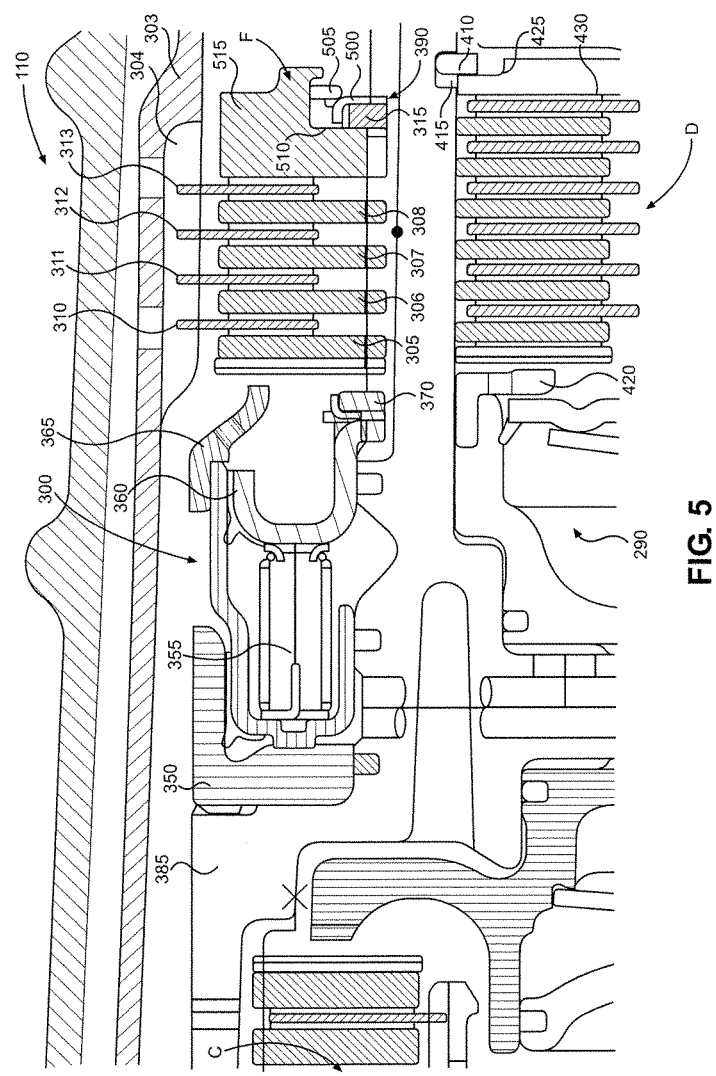
FIG. 5 is a partial cross-section showing the friction element assembly and the piston assembly in accordance with a second embodiment of the present invention.

With reference now to FIG. 5, an alternative embodiment is shown in which a snap ring keeper 500 and a second snap ring 505 are used to prevent snap ring 315 from exiting mounting groove 390 due to a centrifugal force. During installation, snap ring 315 is expanded, placed into a notch 510 in a pressure plate 515 and then allowed to contract so that it enters mounting groove 390. As discussed above, a centrifugal force of a sufficient strength can cause snap ring 315 to exit mounting groove 390. To avoid this possibility, snap ring keeper 500 and second snap ring 505 are provided. Second snap ring 505 is a snap ring of the type that is contracted during installation and then expands when released. As such, second snap ring 505 is held in place by pressure plate 515. In contrast, snap ring keeper 500 is formed as an unbroken ring. Snap ring keeper 500 and second snap ring 505 hold snap ring 315 in place by preventing expansion of snap ring 315 after installation. Specifically, second snap ring 505 is prevented from expanding, due to a centrifugal force, by pressure plate 515. Second snap ring 505 contacts snap ring keeper 500 and holds it in place, and, in turn, snap ring keeper 500 contacts snap ring 315 and prevents it from expanding. Accordingly, snap ring 315 cannot exit mounting groove 390 due to a centrifugal force and, in such an embodiment, there is no need for an assembly notch and an operational notch.

Figure 6:
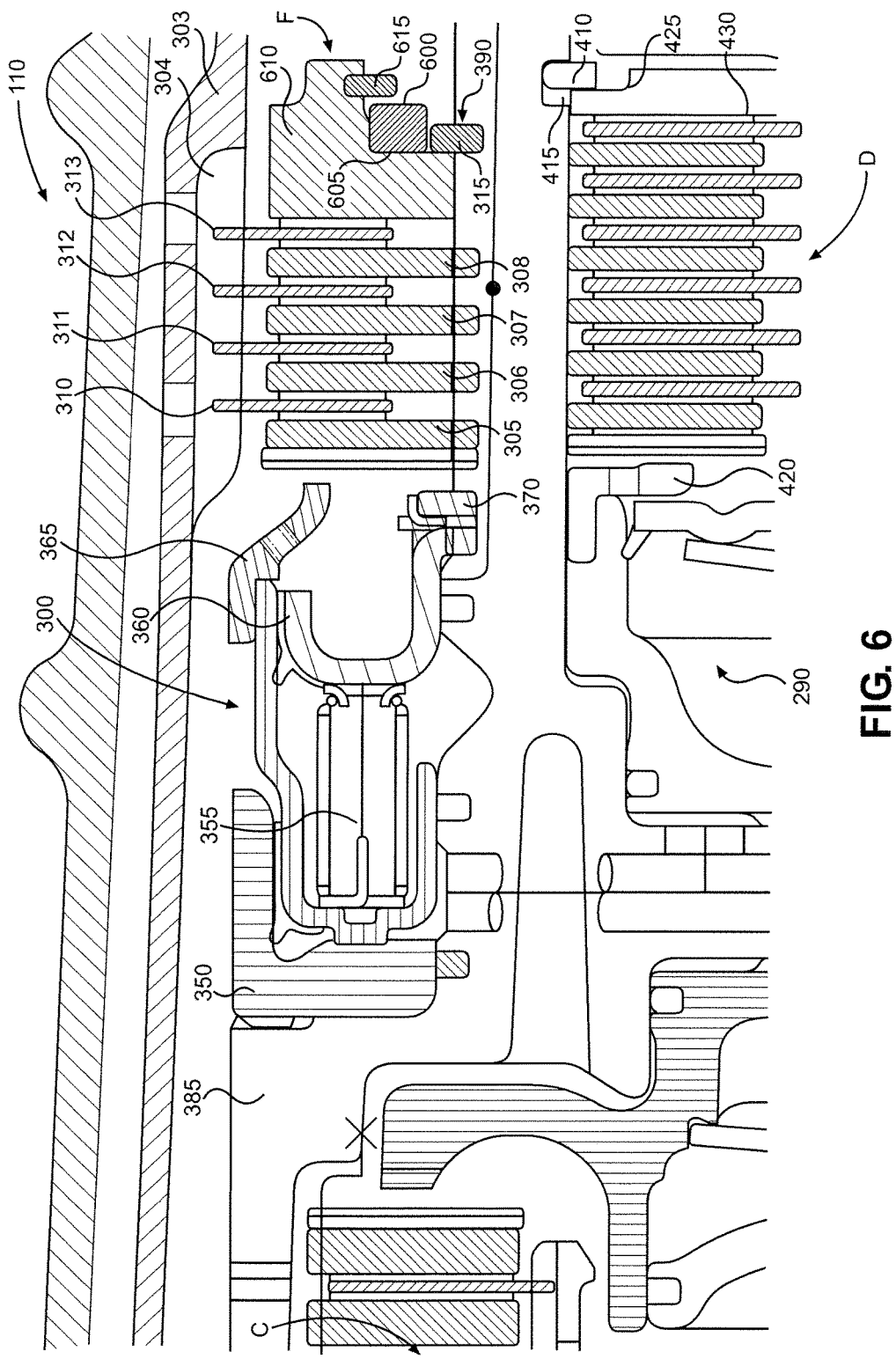
FIG. 6 is a partial cross-section showing the friction element assembly and the piston assembly in accordance with a third embodiment of the present invention.

FIG. 6 shows an additional embodiment in which a third snap ring 600 is used in place of snap ring keeper 500. As above, snap ring 315 is expanded, placed into a notch 605 in a pressure plate 610 and then allowed to contract so that it enters mounting groove 390. To prevent snap ring 315 from exiting mounting groove 390 due to a centrifugal force, a second snap ring 615 and third snap ring 600 are provided. Both second snap ring 615 and third snap ring 600 are snap rings of the type that are contracted during installation and then expand when released. Accordingly, second snap ring 615 and third snap ring 600 are held in place by pressure plate 610. Additionally, third snap ring 600 is prevented from exiting notch 605 by second snap ring 615. As a result, snap ring 315 is prevented from expanding, and thereby exiting mounting groove 390, by third snap ring 600, which is itself held in place by pressure plate 610 and second snap ring 615.

Based on the above, it should be readily apparent that the present invention provides a transmission design that allows for the installation of a snap ring that is expanded during installation and prevents the snap ring from moving once installed. Although described with reference to preferred embodiments, it should be readily understood that various changes or modifications, both major and minor, could be made to the invention without departing from the spirit thereof. For example, the present invention is usable with both clutches and brakes. Additionally, the transmission can include a greater or lesser number of friction element assemblies, piston assemblies, planetary gear sets and gear ratios. In general, the invention is only intended to be limited by the scope of the following claims.

The invention claimed is:
1. A transmission of a motor vehicle comprising:
a transmission shaft including an external surface;
a clutch or brake assembly for the transmission of the motor vehicle including:
 a friction element assembly mounted on the transmission shaft;
 a piston assembly for actuating the friction element assembly; and
 a first snap ring for retaining the friction element assembly, the first snap ring having an outer radial surface;
a mounting groove formed in the external surface of the transmission shaft, the first snap ring being situated in the mounting groove, wherein the mounting groove is located such that the first snap ring can exit the mounting groove upon expansion of the first snap ring, wherein said first snap ring is configured to be expanded and installed into the mounting groove to secure the friction element assembly;
a second snap ring located near the first snap ring to prevent the first snap ring from exiting the mounting groove; and
further comprising:
 a snap ring keeper having an inner radial surface, the snap ring keeper being configured to contact both the first snap ring and the second snap ring, and the snap ring keeper being configured to prevent the first snap ring from expanding, whereby contact between the inner radial surface of the snap ring keeper and the outer radial surface of the first snap ring prevents the first snap ring from expanding; or
 a third snap ring having an inner radial surface, the third snap ring being configured to contact both the first snap ring and the second snap ring, and the third snap ring being configured to prevent the first snap ring from expanding, whereby contact between the inner radial surface of the third snap ring and the outer radial surface of the first snap ring prevents the first snap ring from expanding.

2. The transmission of claim 1, wherein the friction element assembly includes a pressure plate and the pressure plate is in contact with the second snap ring.

3. The transmission of claim 1, further comprising, in combination, a vehicle in which the transmission is mounted and drivingly connected to wheels of the vehicle.

4. The transmission of claim 1, wherein the transmission comprises the third snap ring.

5. The transmission of claim 1, wherein the friction element assembly includes a pressure plate, and:
the second snap ring contacts an internal surface of the pressure plate opposite the external surface of the transmission shaft; or
the second snap ring is situated in a mounting groove formed in the internal surface of the pressure plate opposite the external surface of the transmission shaft.

6. The transmission of claim 1, wherein the transmission comprises the snap ring keeper.

7. The transmission of claim 6, wherein the snap ring keeper is in the form of an unbroken ring.

8. The transmission of claim 6, wherein the snap ring keeper is in contact with the transmission shaft.

9. The transmission of claim 6, wherein:
the snap ring keeper includes a leg protruding from a remainder of the snap ring keeper; and
contact between the leg of the snap ring keeper and the first snap ring prevents the first snap ring from expanding.

10. A clutch or brake assembly for a transmission of a motor vehicle comprising:
a piston assembly;
a friction element assembly;
a first snap ring having an outer radial surface, wherein the first snap ring is configured to be expanded and installed into a mounting groove formed in an external surface of a transmission shaft to secure the friction element assembly;
a second snap ring, wherein the second snap ring is configured to prevent the first snap ring from exiting the mounting groove; and
further comprising:
a snap ring keeper having an inner radial surface, the snap ring keeper being configured to contact both the first snap ring and the second snap ring, and the snap ring keeper being configured to prevent the first snap ring from expanding, whereby contact between the inner radial surface of the snap ring keeper and the outer radial surface of the first snap ring prevents the first snap ring from expanding; or
a third snap ring having an inner radial surface, the third snap ring being configured to contact both the first snap ring and the second snap ring, and the third snap ring being configured to prevent the first snap ring from expanding, whereby contact between the inner radial surface of the third snap ring and the outer radial surface of the first snap ring prevents the first snap ring from expanding.

11. The clutch or brake assembly of claim 10, wherein the friction element assembly includes a pressure plate and the second snap ring is configured to contact the pressure plate.

12. The clutch or brake assembly of claim 10, wherein the clutch or brake assembly comprises the third snap ring.

13. The clutch or brake assembly of claim 10, wherein the friction element assembly includes a pressure plate, and:
the second snap ring is configured to be contracted and installed in contact with an internal surface of the pressure plate opposite the external surface of the transmission shaft; or
the second snap ring is configured to be contracted and installed in a mounting groove formed in the internal surface of the pressure plate opposite the external surface of the transmission shaft.

14. The clutch or brake assembly of claim 10, wherein the clutch or brake assembly comprises the snap ring keeper.

15. The clutch or brake assembly of claim 14, wherein the snap ring keeper is configured to contact the transmission shaft.

16. The clutch or brake assembly of claim 14, wherein:
the snap ring keeper includes a leg protruding from a remainder of the snap ring keeper; and
the snap ring keeper is configured such that contact between the leg of the snap ring keeper and the first snap ring prevents the first snap ring from expanding.

17. A clutch or brake assembly for a transmission of a motor vehicle comprising:
a piston assembly;
a friction element assembly;
a first snap ring having an outer radial surface, wherein the first snap ring is configured to be expanded and installed into a mounting groove formed in an external surface of a transmission shaft to secure the friction element assembly;
a second snap ring, wherein the second snap ring is configured to prevent the first snap ring from exiting the mounting groove; and
further comprising:
a snap ring keeper, the snap ring keeper being configured to contact both the first snap ring and the second snap ring, and the snap ring keeper being configured to prevent the first snap ring from expanding, wherein the snap ring keeper is in the form of an unbroken ring; or
a third snap ring having an inner radial surface, the third snap ring being configured to contact both the first snap ring and the second snap ring, and the third snap ring being configured to prevent the first snap ring from expanding, whereby contact between the inner radial surface of the third snap ring and the outer radial surface of the first snap ring prevents the first snap ring from expanding.

* * * * *